April 11, 1939. P. F. ROSSMANN 2,154,111
HYDRAULIC BRAKE SYSTEM
Filed Aug. 19, 1936 2 Sheets-Sheet 1

INVENTOR
Peter F. Rossmann.
BY Tibbetts & Hart
ATTORNEYS.

April 11, 1939.  P. F. ROSSMANN  2,154,111
HYDRAULIC BRAKE SYSTEM
Filed Aug. 19, 1936  2 Sheets-Sheet 2
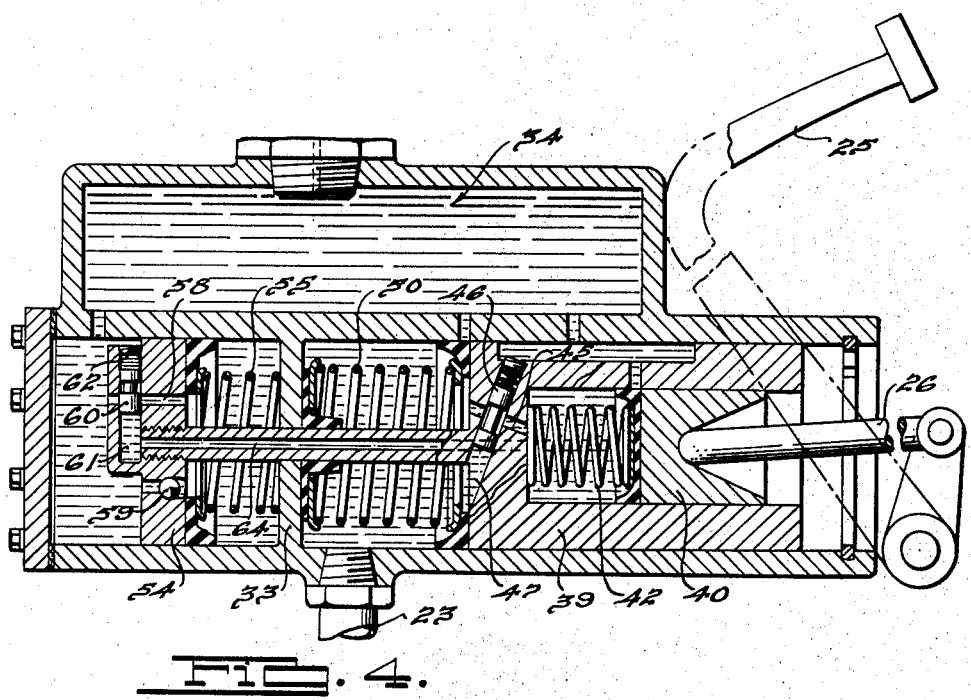
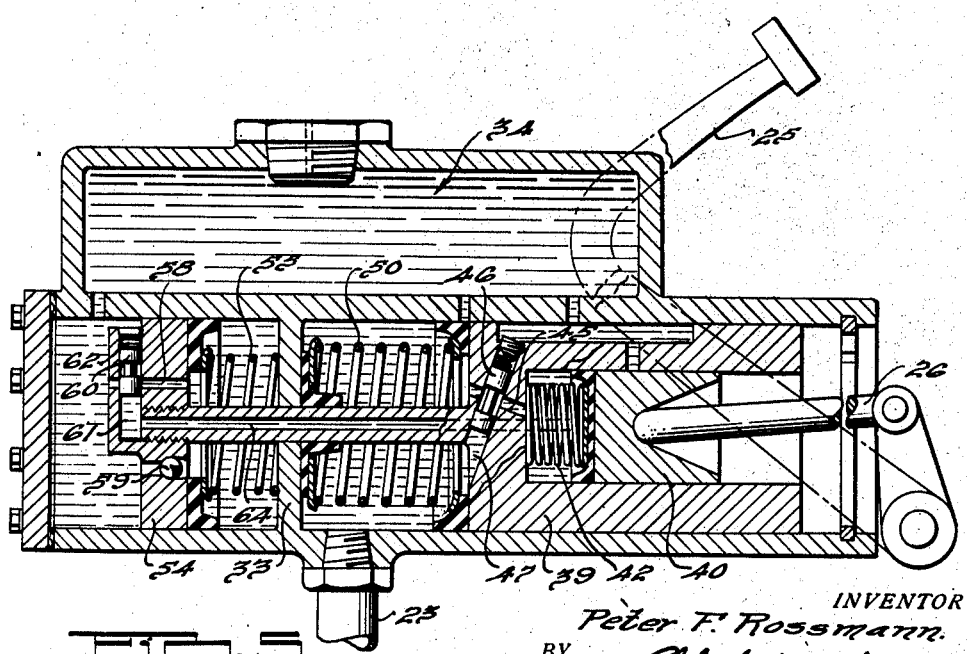
INVENTOR
Peter F. Rossmann.
BY Tibbetts & Hart
ATTORNEYS.

UNITED STATES PATENT OFFICE 2,154,111

HYDRAULIC BRAKE SYSTEM

Peter F. Rossmann, Detroit, Mich., assignor to Packard Motor Car Company, Detroit, Mich., a corporation of Michigan Application August 19, 1936, Serial No. 96,751

13 Claims. (Cl. 60—54.6)

This invention relates to liquid actuator systems and more particularly to liquid actuator systems for vehicle brakes.

In applying the brake elements of a braking system, slack must first be taken up to set the brake elements before they can be applied to their drums. When liquid is utilized to set and to apply the brake elements there must be a definite displacement of liquid in the braking system resulting usually from physical actuation of some form of piston means. The diameter of the piston means determines the length of stroke required to displace fluid in the system sufficient to apply the brake elements and, of course, the magnitude of pressure required is also determined by the piston diameter. Thus a lesser movement is required to displace a given amount of fluid with a large diameter piston than with a smaller diameter piston, and more pressure is required to move the larger diameter piston than is required to move a smaller diameter piston. A long stroke piston is objectionable because of the necessity sometimes for quick brake application and a high pressure application for operating a piston is objectionable because of the physical exertion required.

This invention has for its object the provision of a liquid braking system in which liquid is displaced under low pressure to take up slack and thereafter displaced under higher pressure to apply the brake elements.

Another object of the invention is to provide liquid displacing means for a braking system consisting of different diameter pistons operable by a physically actuated lever and cooperating to quickly take up slack under low pressure and to thereafter apply the braking elements under high pressure.

A further object of the invention is to provide a physically operated liquid displacing means for a braking system in which the displacement pressure in the system is compounded during actuation without a material increase in physical effort.

These and other objects of the invention will appear from the following description taken in connection with the drawings, which form a part of this specification, and in which:

Fig. 4 is a view similar to Fig. 2 showing the fluid displacing means in an intermediate position of its operation;

Fig. 5 is another sectional view similar to Fig. 2 showing the fluid displacing means in brake applying position.

Figure 1:
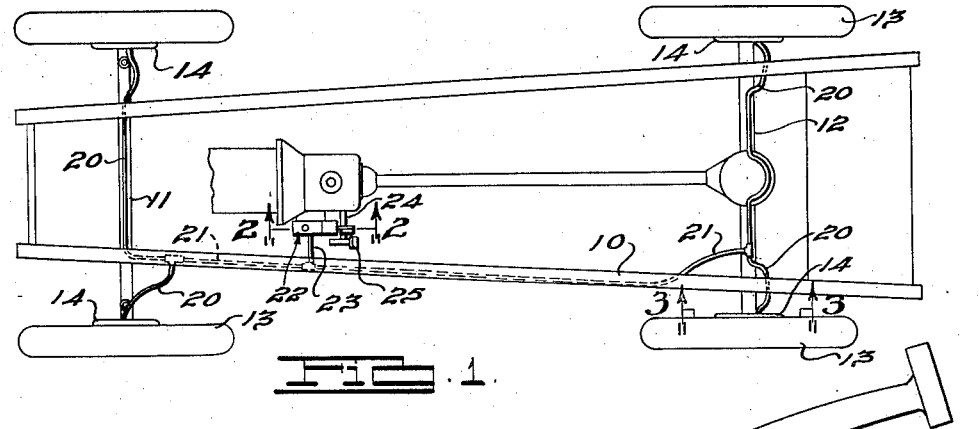
Fig. 1 is a plan view of a motor vehicle chassis having my invention associated therewith.

Referring now to the drawings, 10 indicates a conventional motor vehicle frame having a front axle 11 and a rear axle 12 carrying the usual wheels 13. The wheels are each provided with a brake drum 14, and suitably fixed adjacent each drum is a backing plate 15 on which is pivotally mounted a pair of brake elements or shoes 16. A spring 17 is employed to normally hold each pair of shoes out of engagement with their drum.

Between each pair of brake elements is conventional means, indicated at 18, operated by liquid pressure to set and apply the elements against their associated brake drum. Such means each consists of a fluid casing 19 with which a branch conduit 20 communicates, the casing carrying actuating means (not shown) being of any suitable type such, for instance, as shown in Patent No. 1,962,406, issued June 12, 1934, to A. D. Pentz. A main conduit 21 connects with the branch conduits and between a casing 22, containing displacement means, and the main conduit is a connecting conduit 23.

The conduits and casings, previously described, constitute a closed liquid system in which the liquid is displaced to set and apply the brake elements. Within the casing 22 is arranged piston means adapted to be actuated when physical force is exerted against the lever or pedal 25. This pedal is pivotally mounted on bearing 24 and carries an actuator rod 26 engaging the piston means. The braking system so far described is conventional and the present invention relates to the liquid displacing means carried in the casing whereby improved brake operating conditions are obtained.

The casing 22 has a cylindrical portion 30 divided into chambers 31 and 32 by a partition 33 and above this cylindrical portion is formed a liquid reservoir chamber 34. Port 35 connects the reservoir with chamber 31 and spaced ports 36 and 37 connect the reservoir with chamber 32. Conduit 23 is connected with chamber 32, adjacent the partition, through port 38.

Figure 2:
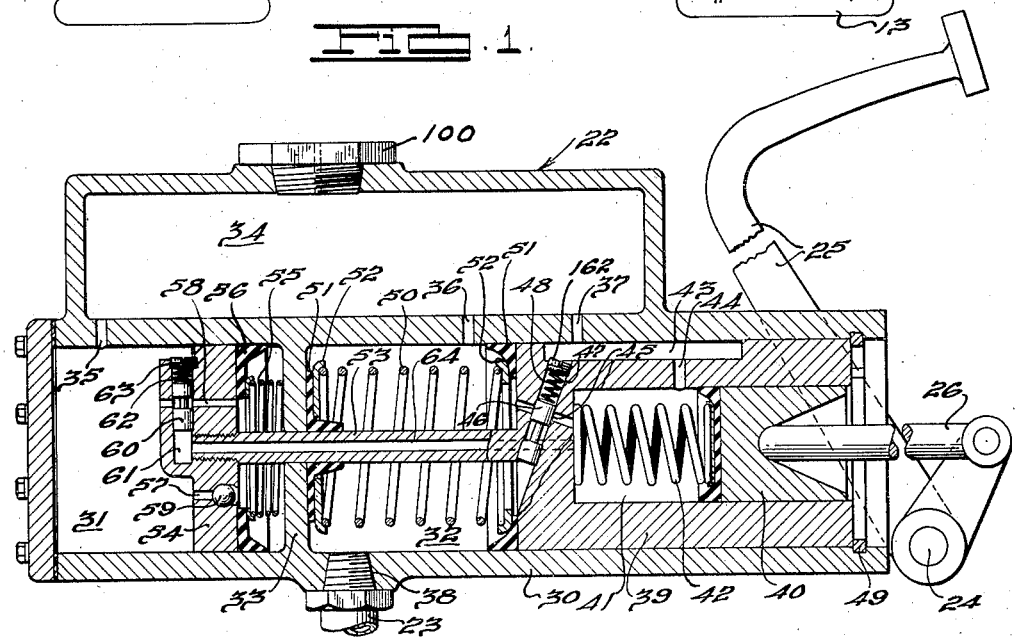
Fig. 2 is a sectional view of the fluid displacing means of the braking system taken on line 2—2 of Fig. 1.
Figure 3:
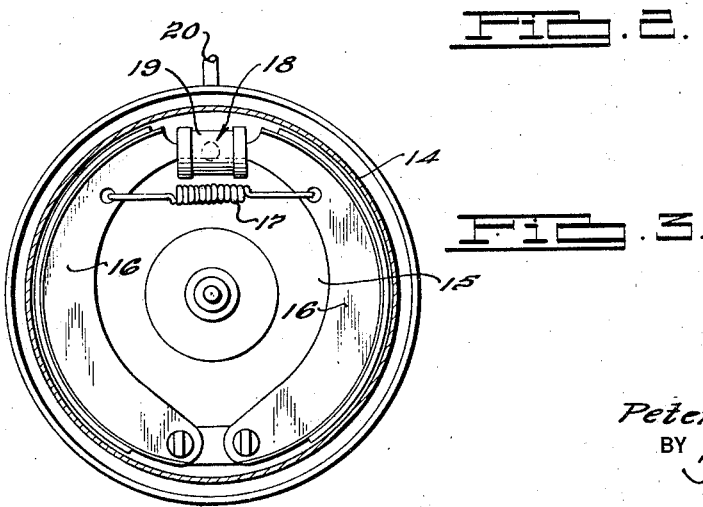
Fig. 3 is a sectional view through one of the vehicle wheels taken on line 3—3 of Fig. 1.

In the chamber 32 is arranged a compound piston means adapted to displace liquid through the port 38 to actuate the mechanism for setting and applying the brake elements. This piston means comprises a large diameter piston 39 and a smaller diameter piston 40. The larger diameter piston has a sliding fit in the chamber 32 and is bored at one end to provide a cylindrical chamber 41 in which the small diameter piston has a sliding fit. In the chamber 41 is a coil spring 42 engaging the head ends of the pistons to normally hold the piston 40 in retracted ineffective position as shown in Fig. 2. The rod 26 extends through the open end of the chamber 32 in the piston 39 and operatively engages the piston 40.

Communication is established between the reservoir chamber 34 and chamber 41 by port 37, and a peripheral recess 43 and a port 44 in piston 39. Communication is established between chamber 41 and chamber 32 by a passage 45 in the head of piston 39 extending at an angle to the piston axis. Passage 47 is drilled in the head of piston 39 to intersect passage 45 and one end thereof opens into chamber 32 while the other end opens into the peripheral piston recess 43. In this passage 47 is arranged a valve 46 normally held by coil spring 48 in a relation to close the passage 45, such valve being responsive to pressure in chamber 32. The spring seats against a vented plug 162 screwed into the end of passage 47. Near the open end of the chamber 32 is a snap-ring stop member 49 which limits the outward movement of piston 39 and a coil spring 50 in chamber 32 serves to urge such piston toward the stop member where it is in ineffective liquid displacing position. Gaskets 51 in chamber 32 bear against the head of piston 39 and the partition 33 and engaged therewith are seat members 52 for spring 50.

Piston 39 is formed with an axially extending stem 53 that projects through an opening in partition 33 into the chamber 31. On the end of this stem is screwed a disk 54 having a sliding fit in the chamber 31. Between the disk and the partition 33 is arranged a coil spring 55 for the purpose of holding gasket 56 against the disk. Passages 57 and 58 are drilled through the disk and extend in the same direction as its axis, the passage 57 having a check valve 59 therein allowing flow of liquid thereby in only one direction. Fluid flow through passage 58 is controlled by valve 60 slidable in passage 61 drilled in the disk and intersecting passage 58. Such valve is normally held by spring 62 in position to allow flow through passage 58, the spring seating against a vented plug 63. Passage 64 extends through the head of piston 39 and the stem 53 to establish communication between chamber 41 and passage 61.

As shown in Fig. 2, the piston means and pedal are in ineffective liquid displacing position, some suitable form of stop means (not shown) being employed to limit the rearward travel of the pedal. The spring 50 normally holds the piston 39 against its stop ring, and such piston and spring 42 hold piston 40 in contact with the rod 26 by which medium the foot lever is moved to ineffective or rearmost position. In order to make the braking system effective, foot pressure is applied to rock the lever forward, that is, to the left as viewed in Fig. 2, whereupon the piston 40 will be moved to the left, without moving piston 39 as spring 42 is weaker than spring 50, thus displacing part of the liquid in chamber 41 through port 44 into recess 43 and through port 37 into the reservoir chamber 34. When such movement of piston 40 closes port 44 liquid escape therethrough is cut off and the trapped liquid provides a driving connection so that further pressure against the foot lever will move piston 39 with the piston 40 toward the left to shut off port 36 and force liquid from chamber 32 through conduit 23, as shown in Fig. 4. This displacement of liquid from chamber 32 through conduit 23 by piston 39 produces pressure in the casings 19 which moves the brake elements toward their drums. When the piston 39 is moved far enough to close port 36 further movement will build up pressure in chamber 32 and passage 64 and at a predetermined magnitude, preferably when the slack is taken up in the system and the brake elements are set to their drums, valves 60 and 46 will be simultaneously displaced in their passages, as shown in Fig. 4. The valve 60 will be moved to close passage 58 and the valve 46 will be moved to open passage 45. Closing of passage 58 prevents escape of fluid between the disk 54 and the partition 33 so that such trapped fluid prevents pressure in chamber 32 from forcing piston 39 to the right. With the passage 45 open further pressure against the foot lever will move piston 40 to the left, while piston 39 remains stationary, and displaces fluid from chamber 41 creating increased pressure on the fluid in the chamber 32 and the conduits connected therewith, see Fig. 5. Such increased pressure will act upon the mechanism in casings 19 to apply the brake elements which have already been set.

The vents in plugs 63 and 163 prevent pressure being built up behind the valves 60 and 163. The filler plug 100 is likewise vented to allow free flow of fluid between the reservoir chamber and chambers 31 and 32. The freely movable one-way ball valve 59 allows substantially free flow of fluid thereby so that no reduced pressure occurs in the space between disk 54 and partition 33 when the piston means is moved quickly.

The piston means provides for the setting of the braking elements by a relatively short pedal movement because of the large diameter of piston 39 and as there is small resistance to moving the brake elements to set position only medium force or physical effort is required for this purpose. As the brake elements are applied by a small diameter piston movement, a relatively small force is required for this operation. The compound piston structure therefore provides for quickly setting the brake elements with a short pedal movement and for applying the set brake elements by a relatively small amount of force. As a result efficient braking is effected without extreme physical exertion.

When pressure against the foot lever is released pressure in chambers 32 and 41 drops whereupon valve 60 is returned to open passage 58 and valve 46 is returned to close passage 45. Fluid can thus flow through passages 57 and 58 so that the disk 54 and stem 53 no longer prevent movement of piston 39 to ineffective position and the spring 50 will return the piston 39 to ineffective position. The spring 42 will also act to return the piston 40 to ineffective position so that the port 44 is again open to the reservoir chamber. When the port 36 is uncovered by piston 39 fluid in the conduits will flow back into the chamber 32 due to the pressure relief and the action of spring 17, so that the brake elements 15 and 16 will be released from engagement with the brake drums. The pistons are shown in ineffective position in Fig. 2 and return of piston 40 will move the foot pedal 25 rearwardly against its stop (not shown).

The fluid displacement means herein described is simple, compact and efficient.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a fluid operated system for applying a brake, a fluid containing casing having an outlet in the system, a hollow piston reciprocable in the casing, a second piston reciprocable in the hollow piston, said hollow piston having a passage therein leading from its interior to the casing, a spring seated valve in the passage, said valve being opened by a predetermined pressure in the casing, and a physically operable mechanism for reciprocating said second piston, said pistons being movable together upon actuation of said mechanism while said valved passage is closed and the second piston being alone movable by said mechanism while said valve is open.

2. In a fluid operating system for applying a brake, a fluid containing casing communicating with the system, a hollow piston reciprocable in the casing, a second piston reciprocable in the hollow piston, said hollow piston having a passage in the head leading from its interior to the interior of the casing, a spring pressed valve in the hollow piston normally closing the passage therein and operated in response to a predetermined pressure in the casing to open the passage, spring means in the casing exerting pressure to normally move said hollow piston into ineffective position, a physically operable mechanism for actuating said second piston, and spring means between said pistons normally urging said second piston into ineffective position, said pistons being movable together by said mechanism while said piston passage is closed and the second piston being alone movable by said mechanism while said piston passage is open.

3. In a fluid operating system for applying a brake, a fluid containing casing having an open connection with the system, a hollow piston reciprocable in the casing, a second piston reciprocable in the hollow piston, said hollow piston having a passage therein leading from its interior to the interior of the casing, a spring pressed valve normally closing the passage and responsive to a predetermined fluid pressure increase in the casing to open said passage, and a physically operable mechanism for reciprocating said second piston, said pistons being movable together by said mechanism while said passage is closed by said valve and the second piston being alone movable by said mechanism when the said passage is open.

4. In a fluid operating system for applying brake members, a fluid containing chamber in open connection with the system, a hollow piston reciprocable in the chamber, a second piston reciprocable in the hollow piston, said hollow piston having a port adapted to be closed by said second piston, physically operable means connected to actuate said second piston, the initial movement of said second piston in the hollow piston closing the port and trapping fluid in the hollow piston whereby a fluid driving connection between the pistons is established to transmit motion from the second piston to the hollow piston, said fluid driving connection providing the wall means for operating said hollow piston in its pressure stroke, and spring means associated with said hollow piston opposing physical operation of the second piston.

5. In a fluid actuating system for vehicle brake members, fluid displacing means comprising a casing having separated aligned chambers and a reservoir above and in communication with the chambers, a hollow piston in one cylinder, spring means in the piston chamber urging the piston toward fluid pressure relieving position, a second piston in the hollow piston, spring means between the pistons normally urging the second piston toward ineffective position, said hollow piston having a port open to the reservoir and uncovered by the second piston while in ineffective position, said piston chamber being open to the fluid system, said hollow piston having a passage through its head wall, a spring pressed valve in the head passage normally held in position closing the valve but responsive to a predetermined pressure in the piston chamber to open the passage, a disk in the other chamber, said disk having two passages extending in an axial direction therethrough, a one-way valve in one of said disk passages, a spring pressed valve in the other disk passage normally in open position, a stem extending from the hollow piston head and fixed to the disk, said disk, stem and hollow piston having passage means therein establishing communication between the pressure responsive valve controlling the disk passage and the interior of the hollow piston, and physically operable means engaging said second piston, said second piston being movable to shut off the port in said hollow piston and to thereafter move said hollow piston until pressure in the piston chamber opens the valve in the piston head passage, said pressure valve in said disk being moved to closed position in response to pressure in the stem passage simultaneously with the opening of the valve in said hollow piston head, the simultaneous valve movement being arranged at the time the brake members are set and further movement of the second piston applying the brake members.

6. In a fluid actuating system for vehicle brake members, fluid displacement means comprising a casing formed with partition means defining separate aligned lower chambers and an upper reservoir chamber, said partition means having a port connecting the reservoir chamber with one lower chamber and a pair of ports connecting the reservoir chamber with the other lower chamber, a hollow piston in the chamber having the two port connection with the reservoir chamber, said piston having a peripheral groove of a length to be open to one of the ports during the full stroke and a port between the groove and the interior, a second piston slidable in the hollow piston, a coil spring between the hollow piston head and the partition means between the aligned chambers, a coil spring in the hollow piston engaging the head end of the second piston, said hollow piston having a first passage through the head between the interior and the piston chamber and a second passage in the head intersecting the first mentioned passage and open to the chamber, a valve in the second passage in the head arranged to control fluid flow through the first passage in the head of the hollow piston, a coil spring in the second passage in the piston head normally holding the valve in closed position, a connection between the piston chamber and the system, a hollow stem fixed to the hollow piston head and extending through the partition means between the aligned chambers, a disk fixed to the end of the stem in the chamber opposite the piston chamber, said disk having two ports extending therethrough in an axial direction and a radial passage intersecting one of the ports, said disk and hollow piston having passages therein connecting the interior of the stem with the interior of the hollow piston and with the radial passage in the disk, a valve slidable in the radial passage in the disk for controlling fluid flow through the intersected port, a coil spring in the radial passage normally holding the disk valve in position opening the intersected port, a one-way ball valve in the other axially extending port in the disk, a foot lever, and connections between the foot lever and the second piston.

7. In a fluid actuating system for vehicle brake members, fluid displacement means comprising a casing having a fluid chamber connected with the system and a fluid reservoir connected with the chamber, a hollow piston in the chamber, a second piston in the hollow piston, a spring in the chamber normally urging the hollow piston toward ineffective fluid displacing position, a spring in the hollow piston between the piston heads, a foot lever connected to engage said second piston, means establishing a fluid driving connection between the pistons during a part of the foot lever application movement, means establishing fluid communication between the chamber and the interior of the hollow piston when the pistons have been moved together a distance to displace sufficient fluid to set the brake members, and means for holding the hollow piston against return movement during further movement of the second piston resulting from continued foot pedal brake applying movement.

8. In a fluid system for applying a brake, a fluid containing casing having an outlet in the system, a hollow piston reciprocable in the casing, a second piston slidably mounted in the hollow piston, said hollow piston having a passage in its head leading from the interior thereof to the interior of the casing and another passage communicating with the casing, a valve normally closing the passage in the piston head and movable by a predetermined pressure in the casing to open the head passage, physically operable means for moving said second piston toward the casing, the initial movement of said second piston closing the passage in the hollow piston communicating with the casing and trapping fluid in the hollow piston, further movement of said second piston moving said hollow piston therewith through the medium of the trapped fluid until pressure in the casing unseats said valve and further movement of the second piston discharging the trapped fluid through the head passage into the casing, and means for holding said hollow piston against return movement while said valve is unseated.

9. In a fluid actuating system for vehicle brake members, fluid displacement means comprising a casing having a fluid chamber connected with the system and a fluid reservoir connected with the chamber, a hollow piston in the chamber, a second piston in the hollow piston, a spring in the chamber normally urging the hollow piston toward ineffective fluid displacing position, a spring in the hollow piston between the piston heads, a foot lever connected to actuate said second piston, means establishing a driving connection between the pistons during a part of the foot lever application movement, means establishing fluid communication between the chamber and the interior of the hollow piston when the pistons have been moved together to displace sufficient fluid to set the brake members, and fluid means for holding the hollow piston stationary during further movement of the second piston resulting from continued foot pedal brake applying movement.

10. In a fluid operating system for applying brake members, a fluid containing chamber in open communication with the system, a hollow piston reciprocable in the chamber, said piston having a passage through its head connecting its interior with the interior of the casing, a spring seated valve normally closing a passage in the piston head and responsive to predetermined pressure in the casing for opening movement, a second piston reciprocable in the hollow piston, said hollow piston having a port communicating with the casing and adapted to be closed by said second piston, and physically operable means connected to actuate said second piston, the initial movement of said second piston in the hollow piston closing the port and trapping fluid in the hollow piston whereby a fluid driving connection is established between the pistons to transmit motion from the second piston to the hollow piston upon further movement of the physically operable means.

11. In a fluid actuating system for vehicle brake members, fluid displacement means comprising a casing having a fluid chamber connected with the system and a fluid reservoir connected with the chamber, a hollow piston in the chamber, a second piston in the hollow piston, a spring in the chamber normally urging the hollow piston toward effective fluid displacing position, a spring in the hollow piston normally urging the second piston toward ineffective position, a foot lever connected to engage said second piston, means establishing a fluid driving connection between the pistons during a part of the foot lever application movement, means establishing fluid communication between the chamber and the interior of the hollow piston when the pistons have been moved together a distance to displace sufficient fluid to set the brake members, and means including an extension of the hollow piston for holding the hollow piston against return movement during further movement of the second piston resulting from continued foot pedal brake applying movement.

12. In a fluid actuating system for vehicle brake members, fluid displacement means comprising a casing having an outlet in the system, a hollow piston reciprocable in the casing, a second piston slidably mounted in the hollow piston, said hollow piston having a passage in its head and leading from the interior thereof to the interior of the casing and another passage communicating with the casing, a valve normally closing the passage in the piston head and movable by a predetermined pressure in the casing to open the passage with which it is associated, physically operable means for moving said second piston toward the casing, initial movement of said second piston closing the passage in the hollow piston communicating with the casing and trapping fluid in the hollow piston, further movement of said second piston moving said hollow piston therewith through the medium of the trapped fluid until pressure in the casing unseats said valve and further movement of said second piston discharging the trapped fluid through the head passage into the casing, a piston extension, and fluid means for retaining said piston extension against return movement while the second piston is displacing fluid from said hollow piston in the last portion of its brake applying movement.

13. In combination with a fluid brake applying system, a master fluid casing, a free hollow piston in the casing, a physically operable piston slidable in the hollow piston, valve means for trapping fluid between the pistons to drive the free piston upon operation of the other piston, said valve means operated by a predetermined developed pressure in said casing to a position wherein the trapped fluid is released, and thereby allowing continued pressure development in the system by the physically operable piston, and means responsive to pressure developed in said casing for retaining said free piston against return movement after the fluid driving connection is released.

PETER F. ROSSMANN.